US012607209B2

(12) United States Patent
Fabre et al.

(10) Patent No.: US 12,607,209 B2
(45) Date of Patent: Apr. 21, 2026

(54) CONTROL SYSTEM

(71) Applicant: GOODRICH ACTUATION SYSTEMS SAS, Vernon (FR)

(72) Inventors: Antoine Fabre, Saint Pierre de Bailleul (FR); Olivier Vanneuville, Brétigny-sur-orge (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 19/059,445

(22) Filed: Feb. 21, 2025

(65) Prior Publication Data

US 2025/0314261 A1 Oct. 9, 2025

(30) Foreign Application Priority Data

Apr. 3, 2024 (EP) .................................... 24305510

(51) Int. Cl.

| | |
|---|---|
| ***F15B 15/14*** | (2006.01) |
| ***F15B 15/28*** | (2006.01) |
| ***F15B 19/00*** | (2006.01) |

(52) U.S. Cl.

CPC ...... *F15B 15/1438* (2013.01); *F15B 15/2815* (2013.01); *F15B 15/2861* (2013.01); *F15B 15/2892* (2013.01); *F15B 19/005* (2013.01)

(58) Field of Classification Search

CPC .............. F15B 15/1433; F15B 15/1438; F15B 15/2815; F15B 15/2853; F15B 15/2861; F15B 15/2892; F15B 19/005

See application file for complete search history.

(56) References Cited

U.S. PATENT DOCUMENTS

| | | | | |
|---|---|---|---|---|
| 10,473,488 | B2 * | 11/2019 | Henrion | B64C 25/405 |
| 10,801,528 | B2 * | 10/2020 | Mezzino | B64C 13/40 |
| 11,835,069 | B2 | 12/2023 | Rosplock | |
| 11,835,070 | B2 * | 12/2023 | Machijima | F15B 15/2815 |
| 2006/0005645 | A1 | 1/2006 | Zhou | |
| 2023/0407953 | A1 | 12/2023 | Song et al. | |

FOREIGN PATENT DOCUMENTS

| | | | | |
|---|---|---|---|---|
| CA | 1333340 | C | 12/1994 | |
| CN | 204538883 | U | 8/2015 | |
| CN | 109695681 | A | 4/2019 | |
| CN | 110405685 | A | 11/2019 | |
| CN | 111981098 | B | 7/2022 | |
| GB | 2052636 | A | 1/1981 | |
| KR | 20250015141 | A * | 2/2025 | F15B 15/2815 |

OTHER PUBLICATIONS

European Search Report for Application No. 24305510.0, mailed Oct. 16, 2024, 11 pages.

* cited by examiner

*Primary Examiner* — Michael Leslie
(74) *Attorney, Agent, or Firm* — CANTOR COLBURN LLP

(57) ABSTRACT

A control system includes: an actuator piston having an end cap, the actuator piston being reversibly translatable; a supporting member coupled to the end cap, the supporting member being configured to couple the end cap to a sensor; and a retaining device configured to maintain the coupling between the end cap and the supporting member when the end cap fails.

12 Claims, 1 Drawing Sheet

CONTROL SYSTEM

CROSS-REFERENCE TO RELATED APPLICATIONS

This application claims the benefit of European Patent Application No. 24305510.0 filed Apr. 3, 2024, the disclosure of which is incorporated herein by reference in its entirety.

TECHNICAL FIELD

This disclosure relates to a control system.

BACKGROUND

Control systems in aircraft are required to perform control processes on the aircraft. However, in some cases, components of the control system can become decoupled from each other, resulting in loss of control. It is therefore desirable to improve control systems, and in particular, provide a fail-safe control system.

SUMMARY

In a first aspect, there is provided a control system comprising: an actuator piston having an end cap, the actuator piston being reversibly translatable; a supporting member coupled to the end cap, the supporting member being configured to couple the end cap to a sensor; and a retaining device configured to maintain the coupling between the end cap and the supporting member when the end cap fails.

The retaining device may be configured to clamp the end cap together when the end cap fails.

The retaining device may be located within the end cap.

The retaining device may comprise a first part and a second part arranged longitudinally along an axis of the actuator piston.

The first part may be fixedly coupled to the second part.

The first part may comprise a protruding portion and the second part may comprise a recess configured to fix the first and second parts together.

The control system may comprise a fastener configured to couple the supporting member to the end cap.

The retaining device may be configured to maintain the coupling between the supporting member and the end cap when the fastener fails.

The retaining device may be configured to confine the fastener.

The retaining device may be configured to prevent the supporting member decoupling from the end cap when the fastener fails.

The retaining device may comprise an upturned edge in which the fastener is confined.

The sensor may be a linear differential variable transformer.

The sensor may be located adjacent to the actuator piston.

One or more components may be housed within the actuator piston, and the end cap may close the actuator piston.

The end cap and the fastener may be configured to clamp the supporting member and a shoulder of the actuator piston.

The actuator piston may be a linear piston.

In a second aspect, there is provided an aircraft comprising the control system described above.

BRIEF DESCRIPTION OF THE DRAWINGS

Embodiments will be further described and explained by way of example with reference to the accompanying drawings in which.

DETAILED DESCRIPTION

Figure 1:
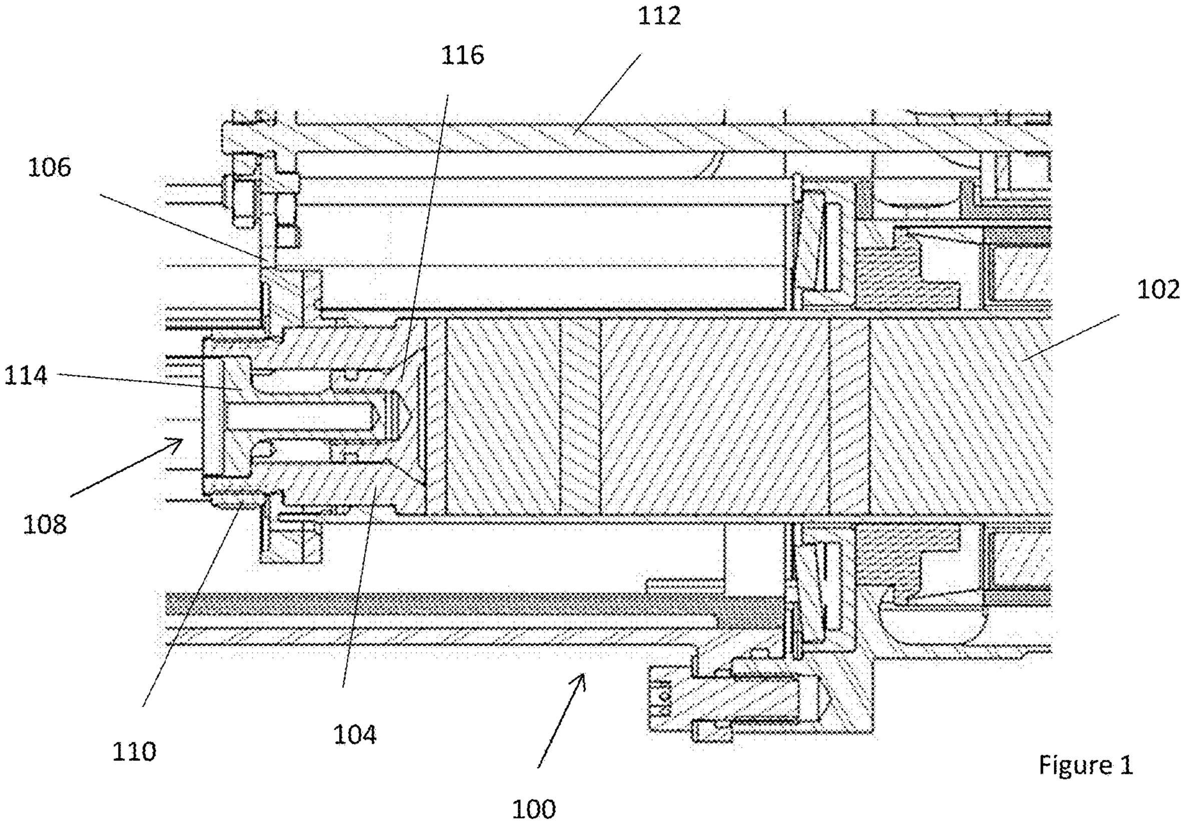
FIG. 1 shows a schematic of a section of a control system.

With reference to FIG. 1, a control system 100 comprises an actuator piston 102 having an end cap 104, a supporting member 106, and a retaining device 108. As described further below, the retaining device 108 is configured to apply a clamping load to the end cap 104 in order to prevent the actuator piston 102 and supporting member 106 from decoupling from each other.

The actuator piston 102 is a linear, electromechanical piston and comprises a hollow, rigid rod configured to reversibly translate along an axis of the actuator piston 102. Although not illustrated, one or more components may be housed within the actuator piston 102, such as, for example, a motor. The end cap 104 closes an end of the actuator piston 102 in order to maintain the one or more components within the actuator piston 102.

The supporting member 106 comprises a metal plate coupled to the actuator piston 102. More specifically, the supporting member 106 is coupled to the end cap 104 of the actuator piston 102. This is because the actuator piston 102 requires a smooth finish. The supporting member 106 may be coupled to the end cap 104 via a fastener 110. In this embodiment, the fastener 110 is a nut. It will be appreciated, however, that any suitable fastener 110 may be used to couple the end cap 104 and the supporting member 106.

As illustrated, the supporting member 106 is also coupled to a sensor 112. The sensor 112 may be located spaced apart (i.e. adjacent) and parallel to the actuator piston 102. In some embodiments, the sensor 112 may be configured to measure a position of the actuator piston 102. The sensor 112 may comprise, for example, a linear variable differential transformer (LVDT) sensor.

If the end cap 104 fractures, the supporting member 106, and therefore sensor 112, may become decoupled from the actuator piston 102. However, monitoring of the position of the actuator piston 102 is essential for aircraft control. As such, fracturing of the end cap 104 can result in a catastrophic failure.

In order to prevent the supporting member 106 and the actuator piston 102 from decoupling, the control system 100 comprises a retaining device 108 configured to maintain the coupling between the end cap 104 and the supporting member 106 when the end cap 104 fails. The retaining device 108 does this by clamping the end cap 104 together (in an axial direction). This means that, should the end cap 104 fracture, the supporting member 106 and actuator piston 102 remain coupled together via the retaining device 108.

The retaining device 108 may be located within the end cap 104, and may comprise a first part 114 and a second part 116. In these embodiments, the first part 114 and second part 116 are fixedly coupled together and are arranged longitudinally along the axis of the actuator piston 102. For example, the first part 114 may comprise a protruding portion that has a threaded outer surface. The second part 116 may comprise a recess that has a threaded inner surface. The recess of the second part 116 may be configured to engage with the protruding portion of the first part 114 in order to fix the first and second parts 114, 116 together.

Figure 2:
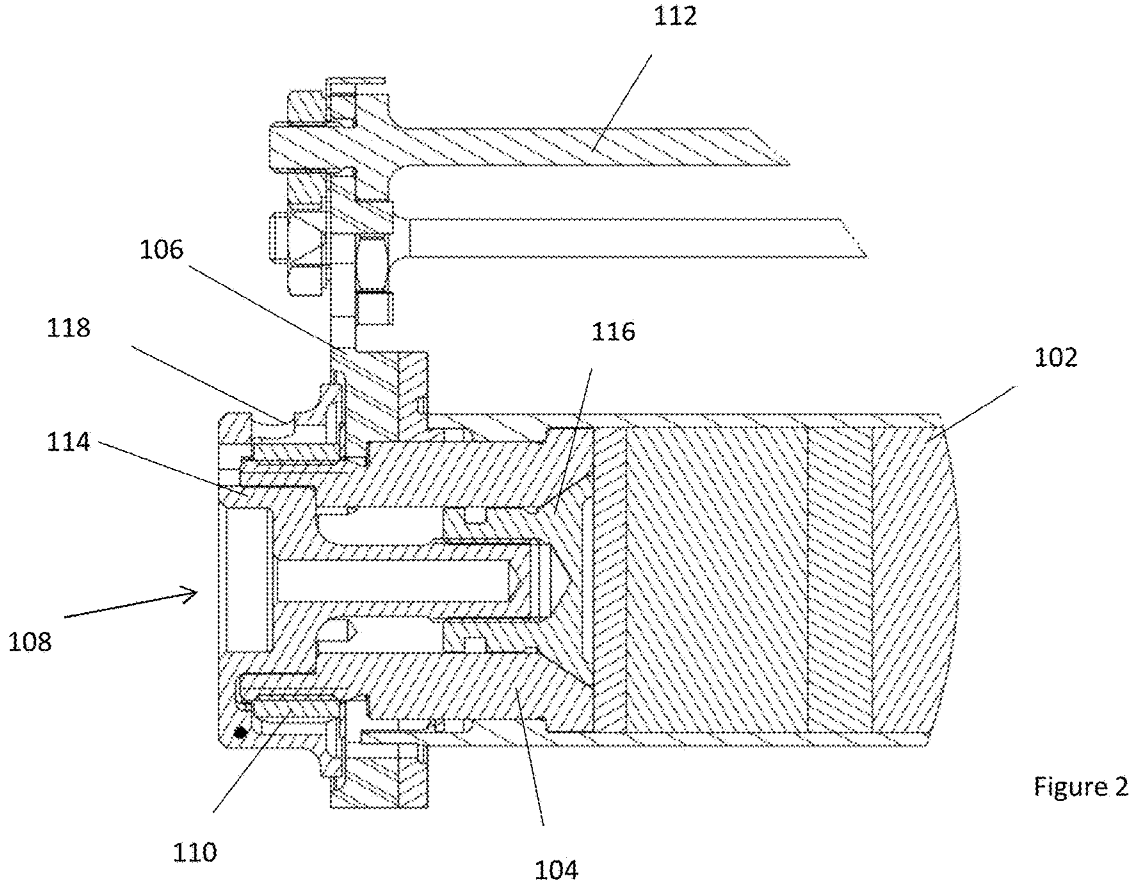
FIG. 2 shows a schematic of a section of a control system.

Additionally, the retaining device 108 may be configured to maintain the coupling between the fastener 110, the supporting member 106 and the end cap 104 when the fastener 110 fails. The retaining device 108 may be configured to do this by confining the fastener 110. as illustrated in FIG. 2, i.e. via an upturned (i.e. U-shaped) edge 118. This prevents debris from the fastener 110 spreading throughout the control system 100 when the fastener 110 fails. It will be appreciated that the upturned edge 118 also prevents the supporting member 106 decoupling from the end cap 104.

Various aspects of the control system disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from the invention in its broader aspects. The scope of the following claims should not be limited by the embodiments set forth in the examples, but should be given the broadest reasonable interpretation consistent with the description as a whole.

The invention claimed is:

1. A control system comprising:

an actuator piston having an end cap, the actuator piston being reversibly translatable;

a supporting member coupled to the end cap, the supporting member being configured to couple the end cap to a sensor;

a retaining device configured to maintain the coupling between the end cap and the supporting member when the end cap fails;

a fastener configured to couple the supporting member to the end cap, wherein the retaining device comprises an upturned edge in which the fastener is confined.

2. The control system of claim 1, wherein the retaining device is configured to clamp the end cap together when the end cap fails.

3. The control system of claim 1, wherein the retaining device is located within the end cap.

4. The control system of claim 1, wherein the retaining device comprises a first part and a second part arranged longitudinally along an axis of the actuator piston.

5. The control system of claim 4, wherein the first part is fixedly coupled to the second part.

6. The control system of claim 4, wherein the first part comprises a protruding portion and the second part comprises a recess configured to fix the first and second parts together.

7. The control system of claim 1, wherein the retaining device is configured to maintain the coupling between the supporting member and the end cap when the fastener fails.

8. The control system of claim 1, wherein the sensor is a linear variable differential transformer.

9. The control system of claim 1, wherein the sensor is located adjacent to the actuator piston.

10. The control system of claim 1, wherein one or more components are housed within the actuator piston, and wherein the end cap closes the actuator piston.

11. The control system of claim 1, wherein the actuator piston is a linear piston.

12. An aircraft comprising:

a control system as recited in claim 1.

* * * * *